United States Patent [19]

Sbalchiero et al.

[11] Patent Number: 5,628,472

[45] Date of Patent: May 13, 1997

[54] METHODS AND APPARATUS FOR BALANCING ARMATURES DURING COIL WINDING

[75] Inventors: Federico Sbalchiero; Massimo Lombardi; Mauro Tarchi, all of Florence, Italy

[73] Assignee: Axis USA, Inc., Tampa, Fla.

[21] Appl. No.: 311,637

[22] Filed: Sep. 23, 1994

Related U.S. Application Data

[63] Continuation-in-part of Ser. No. 42,607, Apr. 2, 1993, Pat. No. 5,383,619.

[51] Int. Cl.$^6$ ...................................... H02K 15/09
[52] U.S. Cl. ...................................... 242/433.3; 29/596
[58] Field of Search ...................................... 242/1.1 R, 7.02, 242/7.03, 7.05 R, 7.05 A, 7.05 B, 7.05 C, 7.11; 29/596

[56] References Cited

U.S. PATENT DOCUMENTS

| | | | |
|---|---|---|---|
| 4,062,502 | 12/1977 | Peck, Jr. | 242/7.11 |
| 4,381,852 | 5/1983 | Ferree et al. | 242/7.13 |
| 4,880,173 | 11/1989 | Lachey | 242/1.1 R |
| 5,029,619 | 7/1991 | Hongo et al. | 242/7.05 C |
| 5,080,295 | 1/1992 | Hongo et al. | 242/7.05 A |
| 5,219,124 | 6/1993 | Shi et al. | 242/1.1 R |
| 5,251,833 | 10/1993 | Furuhashi et al. | 242/1.1 R |
| 5,310,124 | 5/1994 | Linari et al. | 242/1.1 R |
| 5,383,619 | 1/1995 | Cardini et al. | 242/7.05 |
| 5,413,289 | 5/1995 | Santandrea et al. | 242/7.05 A |

FOREIGN PATENT DOCUMENTS

| | | |
|---|---|---|
| 0536981A2 | 4/1993 | European Pat. Off. . |
| 62-196050A | 8/1987 | Japan . |

OTHER PUBLICATIONS

Product Brochure, Magtrol Corporation, Buffalo, New York (Apr. 1994).

*Primary Examiner*—Katherine Matecki
*Attorney, Agent, or Firm*—Fish & Neave; Robert R. Jackson; G. Victor Treyz

[57] ABSTRACT

The balance of rotors for dynamo-electric machines (e.g., electric motor armatures), which are wound with two diametrically opposite, simultaneously applied coils of wire, is improved by ensuring that wire is fed to both coils in substantially similar quantities. This can be accomplished by monitoring the lengths of the two wires as they are fed to the armature using wire sensors located adjacent to the flyer. Alternatively, wire sensors can be provided to monitor the rate at which wire is being fed towards respective flyers and to measure the rate of change of the lengths of those portions of the wires that are supported by the winding machine dancer arms. A control system processes the measurements from these sensors. A wire tensioner having a hysteresis clutch is also provided that allows the tension applied to a wire being wound to be adjusted rapidly. The wire tensioner also picks up slack that may develop in the wire.

29 Claims, 14 Drawing Sheets

METHODS AND APPARATUS FOR BALANCING ARMATURES DURING COIL WINDING

This is a continuation-in-part of application Ser. No. 08/042,607, filed Apr. 2, 1993, now U.S. Pat. No. 5,383,619.

BACKGROUND OF THE INVENTION

This invention relates to making armatures for dynamo-electric machines such as motors and generators. Although the invention will be described primarily in the context of its application to electric motor armatures, it will be appreciated that it is equally applicable to rotating rotors in general which are wound with wire for conducting electric current. For convenience, all such rotors are referred to herein as armatures. Also, although the invention will be described primarily in the context of flyer type armature coil winders, it will be understood that the invention is equally applicable to winders that employ other types of coil wire dispensing members such as the apparatus shown in commonly assigned U.S. Pat. No. 5,484,114.

As shown in FIG. 1, finished armatures 10 wound with wire 12 in coil receiving slots 14 of a lamination stack 16 need to be precisely balanced prior to their final operational use. This avoids mechanical malfunctioning, and also guarantees the integrity of the armature, together with that of other components which are assembled in the environment where the final operational use occurs.

It is common practice to use automatic balancing machines at the end of an armature production line to determine how unbalanced the armature has become during the processing stages and to correct for this unbalanced condition by adding or removing masses on certain parts of the finished armature. The most common technique for automatic balancing of armatures removes masses by milling one or more grooves in the outer circumferential surface of the armature stack 16.

An unbalanced armature (requiring balancing as described above) may be the result of an unbalanced stack 16, shaft 18, or commutator 19, and also may be the result of the overall disposition of the masses of these components as a result of the operations required to assemble them to form the armature. An unbalanced armature can also result from the operational steps required to wind the coils of wire 12 in the slots 14 of stack 16. Although the disposition of the coils (and their number of turns) around the armature is theoretically correct for avoiding an unbalanced condition, practice has shown that the winding process can unbalance the armature.

In order to reduce the need for or the required extent of a final balancing step in the manufacture of armatures, it is an object of this invention to balance the armature during winding.

Formation of armature coils requires simultaneous winding of two wires in two pairs of slots which are symmetrically opposite one another as shown in accompanying FIG. 2. For example, coil 20 is wound in slot pair 22, 23 symmetrically opposite to coil 21 which is simultaneously wound in slot pair 24, 25.

One of the fundamental production specifications for winding armatures usually requires winding symmetrically opposite pairs of slots (such as those referenced above) with the same number of turns of wire. As has been mentioned, this creates a theoretical basis for balancing the armature, although, as will be more fully described below, in practice during winding various factors can cause an unbalanced condition.

Armatures of the type shown in accompanying FIG. 1 are frequently wound with a flyer type winder, although other types of winders (e.g., those shown in above-mentioned U.S. Pat. No. 5,484,114 which is hereby incorporated by reference herein)) are also known and are subject to the same problems and solutions discussed herein. As shown in accompanying FIGS. 3 and 4, the typical flyer type winder includes two opposite flyers 30, 31 which can rotate around respective axes 32, 33 so that each of them dispenses an associated wire 34, 35 coming from a wire spool 36, 37 into a respective pair of coil receiving slots 38, 39 and 40, 41 aligned with prepositioned winding forms 42, 43. The winding forms are required to guide each wire into the coil receiving slots as the wire leaves the associated flyer. The wires required to wind the coils, prior to reaching the flyers from the wire spools, pass through respective tensioner devices 46, 47 which are supposed to guarantee that predetermined tensions are maintained on the wires during the various operations required to wind and form the leads of the armature. The two flyers 30 and 31 rotate at the same time so that each of them forms a coil in respective pairs of slots which are symmetrically disposed on opposite sides of a central transverse axis 80 of the armature. Flyers 30 and 31 are driven by independent motors 44, 45, which are controlled to rotate in unison so that both flyers reach, as precisely as possible, similar predetermined angular positions in time. In particular, the two flyers start and terminate rotation at the same time so that both coils are wound simultaneously with the same number of turns.

At any given instant of time during winding, a difference between the tension of the wires being wound by their respective flyers can result in different elongation of the wires. In a comparison between the two flyers, which are winding opposite coils at the same time, this leads to supplying in certain instances different masses of wire into symmetrically opposite pairs of slots of the armature (such as those shown in FIG. 4). This has an unbalancing effect on the armature. In addition, a coil wound with higher tension will have more compact turns, which influences the radial disposition of its mass (e.g., in relation to the central longitudinal axis 82 of the armature). This also contributes to the formation of unbalanced armatures if variations of this type exist between the opposite coils being formed at the same time by the two flyers.

The foregoing considerations can be further illustrated with the aid of accompanying FIG. 5, in which certain features are somewhat exaggerated. The wires relating to a few coil turns for respective opposite coils 20, 21 are shown. The turns of coil 21 are wound with higher tension, which subjects the wire to a greater amount of elongation for the same number of turns. This causes coil 21 to have less wire mass and to be more compact toward the central longitudinal axis 82 of the armature than coil 20. It should be appreciated that the formation of the overall coils of the armature requires a progressive build-up of wire turns and also of different coils. Later-wound turns and coils surmount earlier-wound turns and coils so that the later-wound material is farther away from central axis 82. As a result of this overlying or overlapping, the presence of an internal coil which is less compact tends to amplify the lack of balance because it also affects the mass disposition of successive coils which will be positioned farther away from the central longitudinal axis 82 of the armature.

One approach for balancing armatures is described in commonly assigned U.S. Pat. No. 5,383,619. As described in U.S. Pat. No. 5,383,619, one way in which to balance an armature involves measuring the amount of wire leaving each of the two wire spools during winding using encoders to determine the velocity or length of the wire. This measurement reveals approximately how much wire is being wound onto the armature by each of the two flyers. If it is determined that more wire is being wound onto the armature by one of the flyers than the other, than the rate at which wire is delivered to each of the flyers can be adjusted.

As described in the above-mentioned U.S. Pat. No. 5,383,619, the wire that is fed to the flyers is tensioned using wire tensioners such as hysteresis brakes. The brakes are adjusted to balance the amount of wire that is being fed to each of the flyers by varying the tension each brake applies to the wire. For example, the retarding force on the wire being wound onto one coil could be increased, so that subsequently, less wire is wound onto that coil.

With this arrangement, rotating encoders 60 for measuring wire consumption are typically placed immediately adjacent to the spool 36, as shown in FIG. 6, which is a reproduction of FIG. 6 of the above-mentioned U.S. Pat. No. 5,383,619. For each flyer, tensioning device 46 is typically placed downstream of encoder 60. After tensioning device 46, wire 34 runs over a pulley wheel 68 of a spring biased dancer arm 69 prior to reaching flyer 30.

The dancer arm 69 is primarily required during operations in which the flyer undergoes abrupt changes in rotation direction and speed. In these situations the dancer arm accommodates any abrupt tightening or loosening of the wire that may occur by resiliently pivoting about axle 70 in the appropriate direction 71. Although the arrangement shown in FIG. 6 is satisfactory for balancing armatures in many situations, such an arrangement does not account for the changes in the length of the wire between tensioning device 46 and flyer 30 due to motions of the dancer arm 69 that might occur under extreme tensioning conditions. As a result, at any given time, the wire consumption measured by encoder 60 may not represent the amount of wire that has actually been wound onto the armature as accurately as might be desired.

Another arrangement for balancing armatures during coil winding is shown in FIG. 7, which is a reproduction of FIG. 11 of the above-mentioned U.S. Pat. No. 5,383,619. Using this approach, wire tension sensors 120 and 121 are provided to measure the tension of the wire being wound onto the armature by flyers 30 and 31. Although the arrangement of FIG. 7 can be used to balance armatures by maintaining the wire tensions measured by sensors 120 and 121 at the same level, tension sensors may not always be as precise as desired when operating at extremely high speeds.

One of the components of conventional winding machines is the wire tensioner. Typically, using the arrangement described in the above-mentioned U.S. Pat. No. 5,383,619, two hysteresis brakes are used to tension the wires as they are fed to respective flyers. Conventional hysteresis brakes contain a stationary stator. A rotor is mounted within the stator for rotational motion. Current is supplied to the field coils of the stator to produce a retarding torque between the stator and the rotating rotor. A pulley attached to the rotor axis applies this retarding torque to the wire. The magnitude of the retarding torque is controlled by varying the current to the stator.

To decrease the wire tension, for example, when it is desired to form lead connections to the commutator of an armature following coil formation, the control current is lowered. However, conventional hysteresis brakes suffer from an effect known as "cogging," in which the tension applied by the brake remains high even after the control current has been lowered. The tension remains at this high level until the rotor has been forcibly moved by the tension of the wire through an angular distance equal to the distance between successive poles. Because the torque remains high, the lead connections are exposed to a larger wire tension than is desired, which can prevent the lead connections from being formed properly.

In view of the foregoing, it is an object of the present invention to provide improved methods and apparatus for balancing armatures during the process of winding.

It is another object of this invention to provide an improved hysteresis brake for use as a wire tensioner that overcomes the effects of cogging.

SUMMARY OF THE INVENTION

These and other objects of the invention are accomplished in accordance with the invention by providing an improved winding machine for balancing armatures during the process of winding coils.

In one embodiment, the winding machine uses wire sensors adjacent to the flyers to determine the respective lengths of wire that are wound onto the armature by each of the two flyers during a predetermined period of time. Based on the relative lengths of the two wires wound onto the armature, the tensions applied by wire tensioning units are adjusted to equalize the lengths of the wires wound onto the armature during subsequent time periods. In most circumstances the mass of each wire length is essentially proportional to the wire's length, so that equalizing the lengths equalizes the masses, thereby balancing the armature. In a preferred embodiment, the predetermined period of time is the amount of time necessary to wind a pair of coils.

Another embodiment of the winding machine of the present invention involves the use of multiple wire and position sensors to even more accurately determine the relative masses of the wires wound onto the armature. One pair of wire sensors is provided adjacent to the flyers and another pair is provided adjacent to the wire supplies. These sensors are used to determine the rate at which wire is being fed towards the flyers at these locations as a function of time. A third pair of sensors is connected to the pivoting axes of the dancer arms, to allow the determination of the rate of change of the lengths of wire supported by the respective dancer arms as a function of time. Optional wire thickness monitors are used to measure the diameters of the wires as they exit the wire supplies.

A wire winding machine control system—preferably microprocessor based—is used to process the signals from the various sensors to determine the respective masses of the two wire lengths that are wound onto the armature during a predetermined period of time. By comparing the relative masses, the wire tension applied to each of the wires can be adjusted to equalized these masses during subsequent winding operations.

An improved hysteresis brake unit is provided that uses a rotatable stator, rather than the conventional stationary stator design. Because the stator is rotatable relative to the housing and the rotor, after the torque control current supplied to the stator has been reduced, a motor can be used to rotate the stator relative to the rotor by a predetermined amount, thereby overcoming the effects of cogging.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
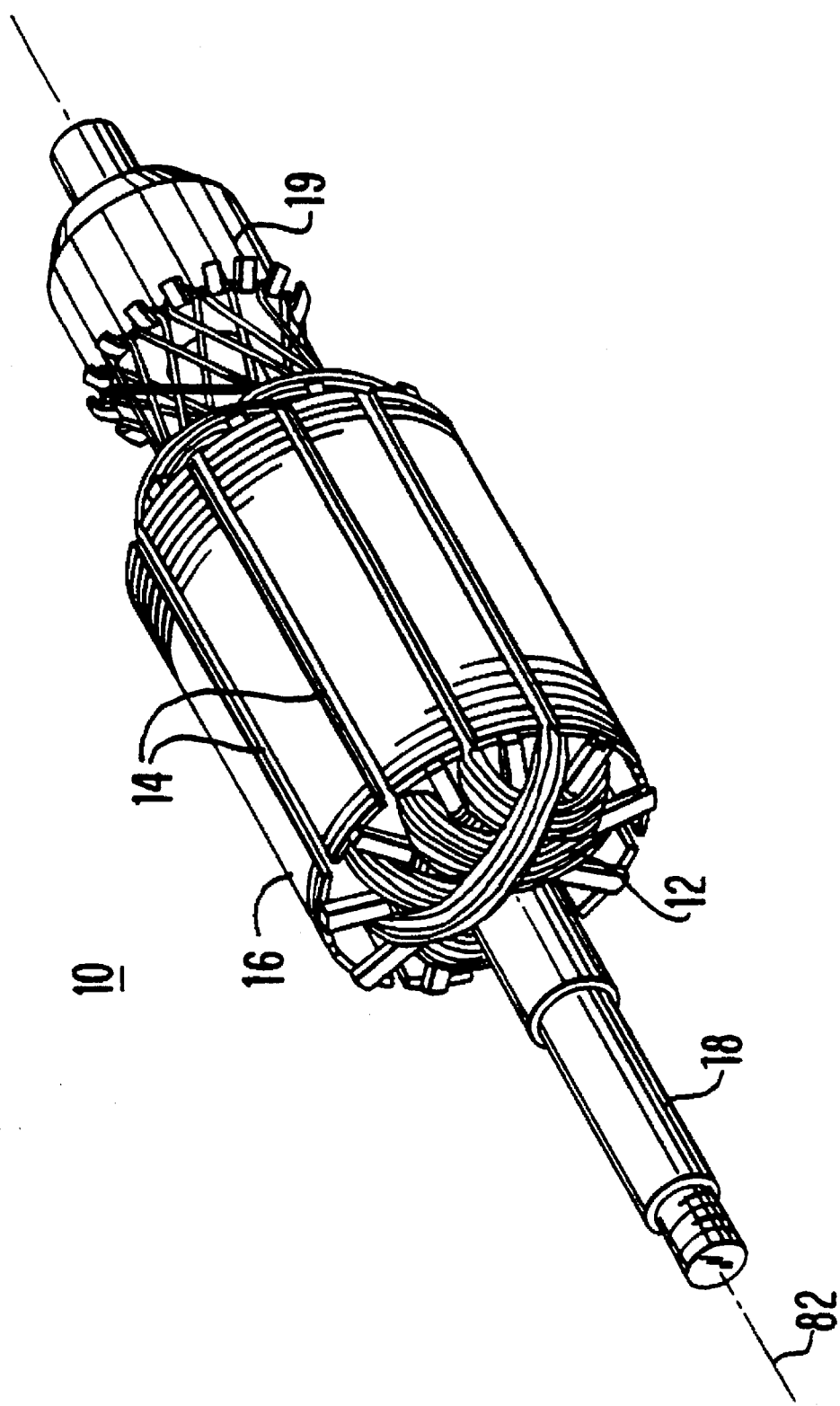
FIG. 1 is a perspective view of a conventional armature which can be wound in accordance with this invention.
Figure 2:
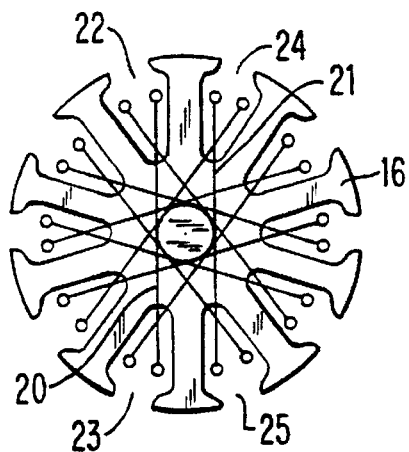
FIG. 2 is a simplified axial end view of the armature of FIG. 1 showing the dispositions of the core slots and the related coils.
Figure 4:
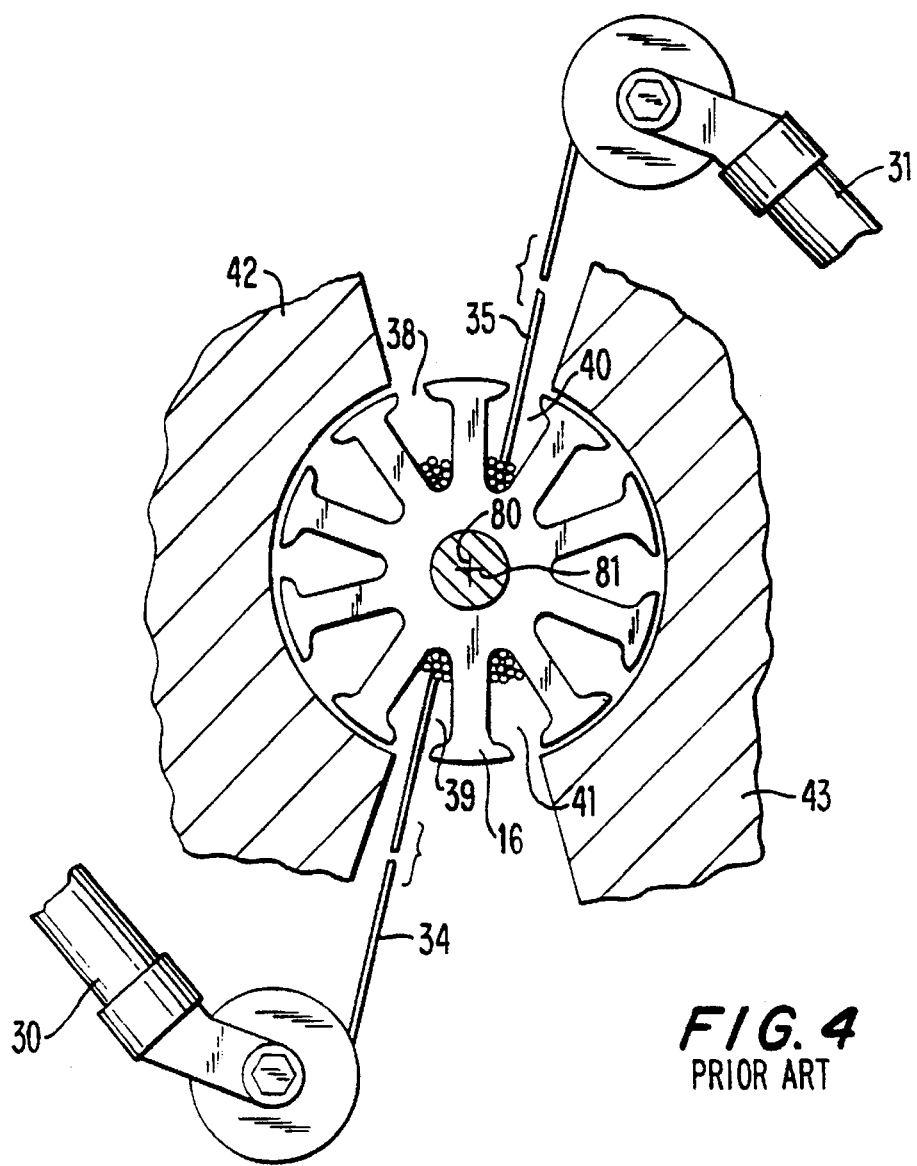
FIG. 4 is an enlarged view, partly in section, of the central portion of FIG. 3.
Figure 3:
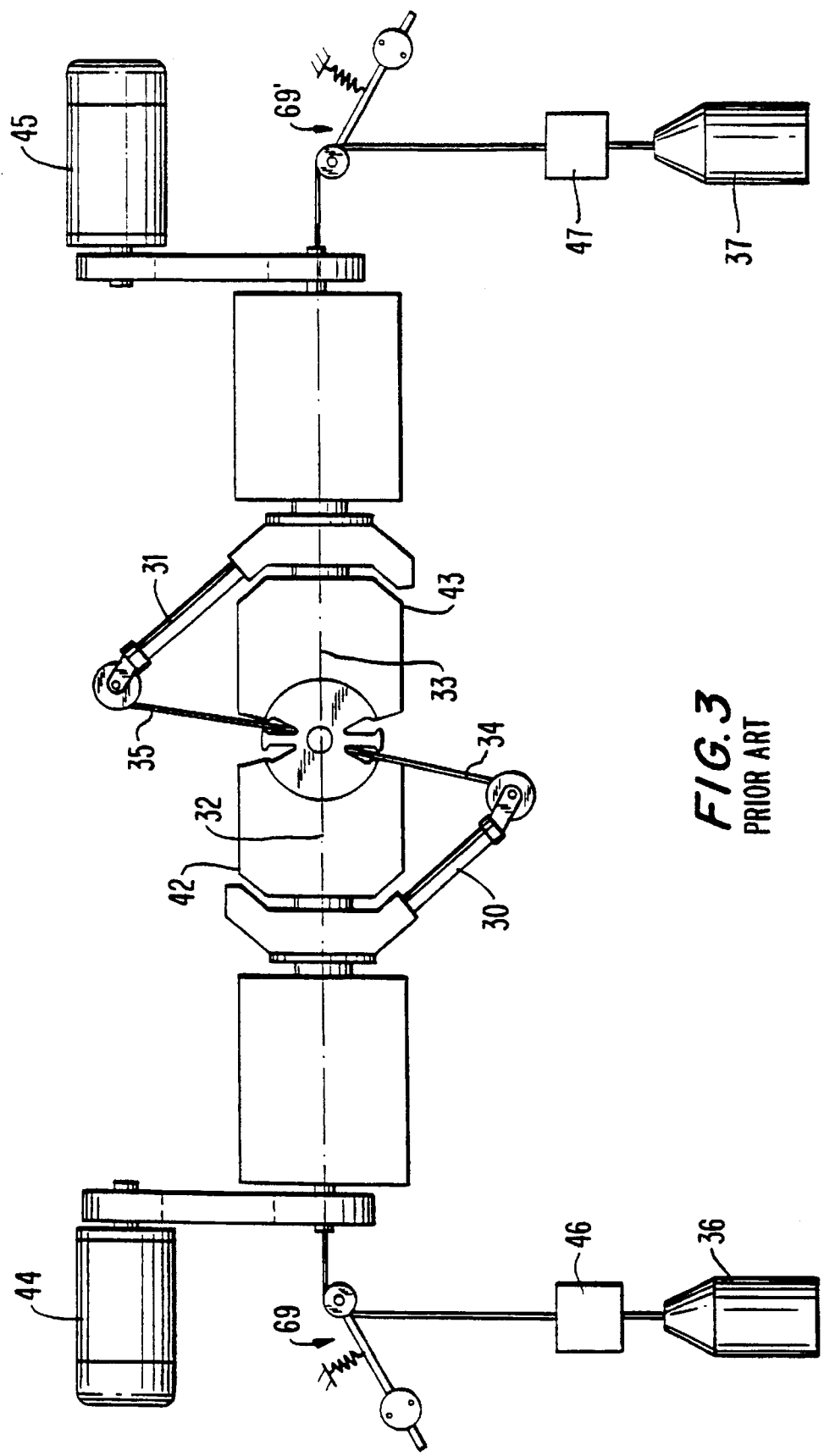
FIG. 3 is a simplified elevational view of a conventional two flyer winding machine.
Figure 5:
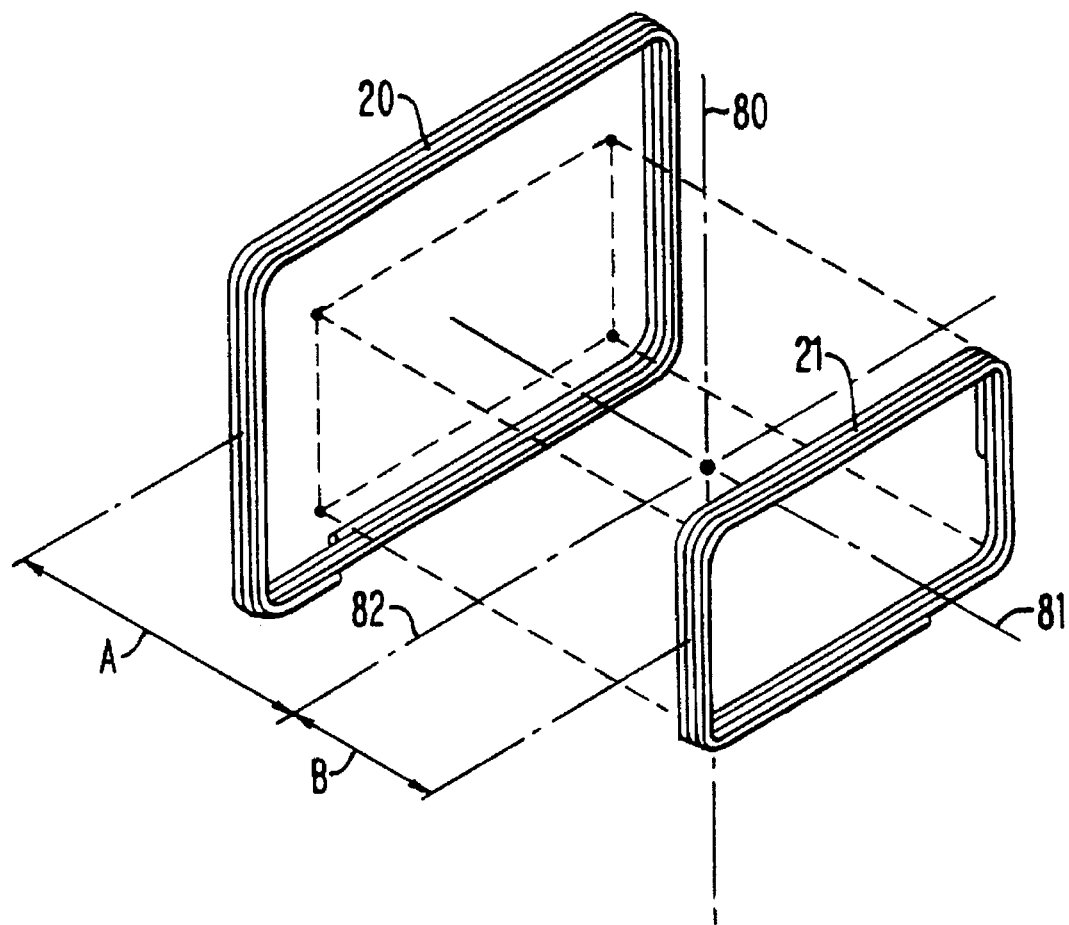
FIG. 5 is a simplified perspective view, with certain features somewhat exaggerated, showing coil turns relating to opposite receiving slots of the armature which may be produced simultaneously by conventional armature winding apparatus.
Figure 6:
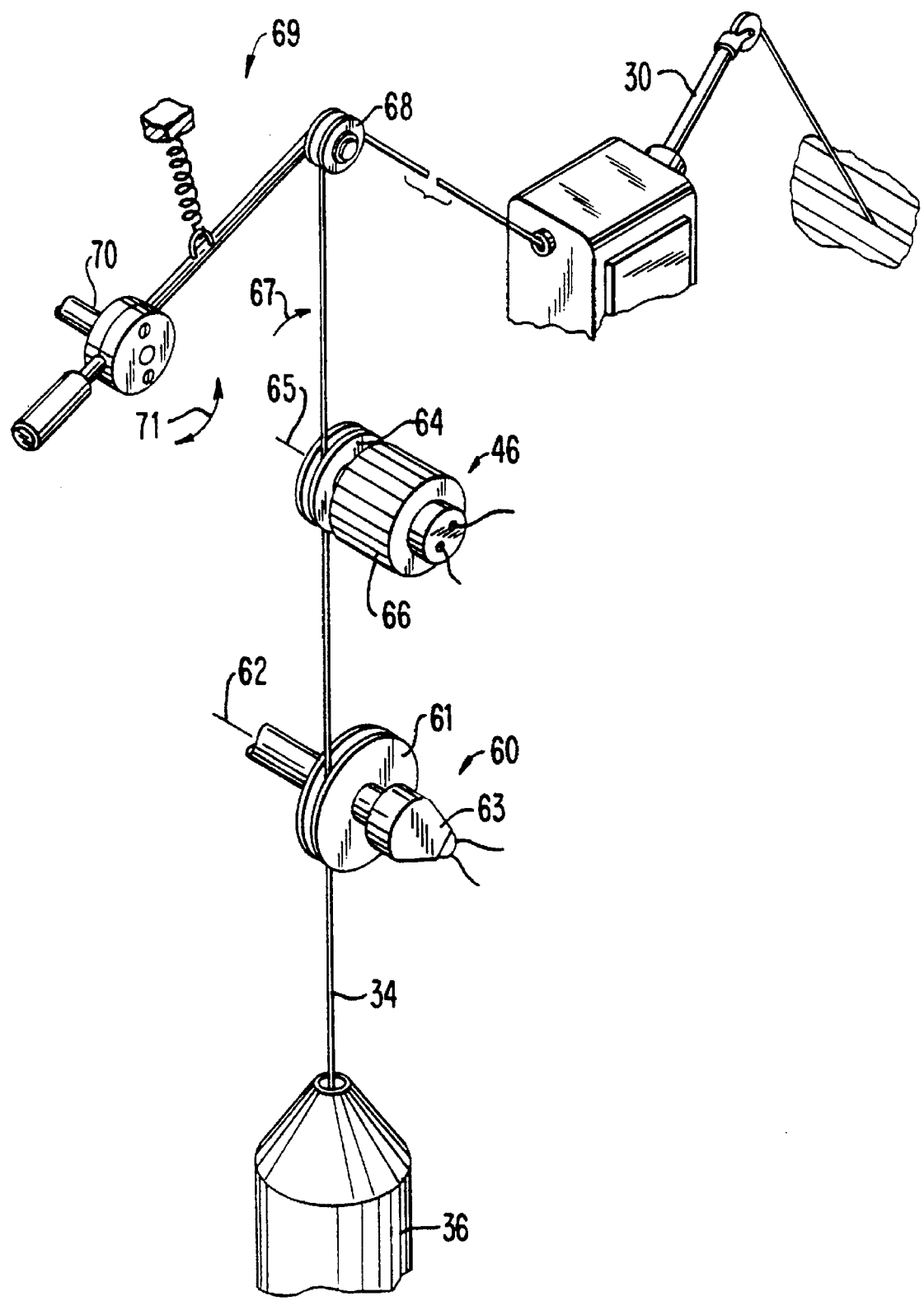
FIG. 6 is a simplified perspective view of an illustrative armature winding apparatus as shown in FIG. 6 of U.S. Pat. No. 5,383,619.
Figure 7:
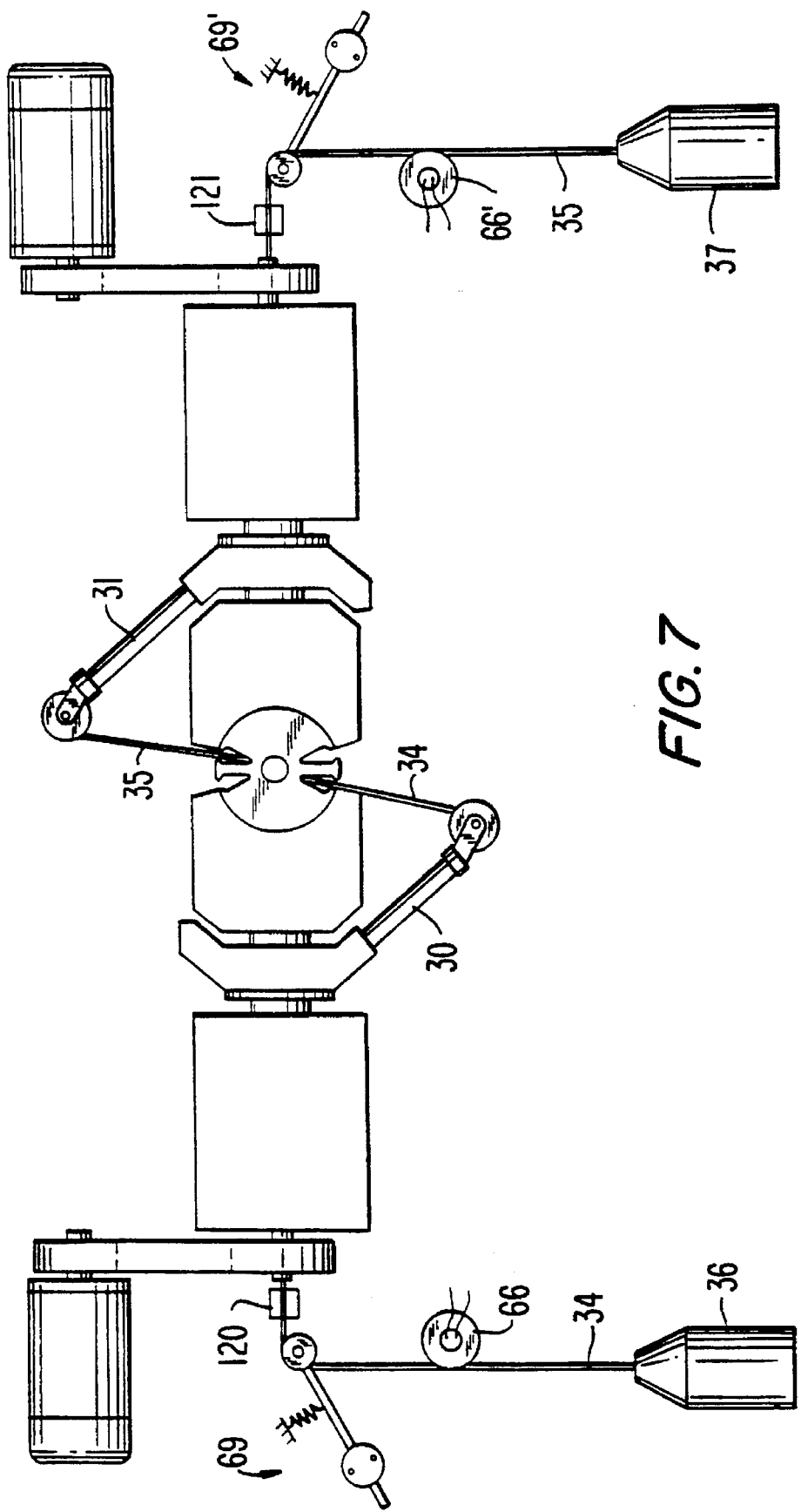
FIG. 7 is a simplified axial view of an illustrative armature winding apparatus as shown in FIG. 11 of U.S. Pat. No. 5,383,619.
Figure 8:
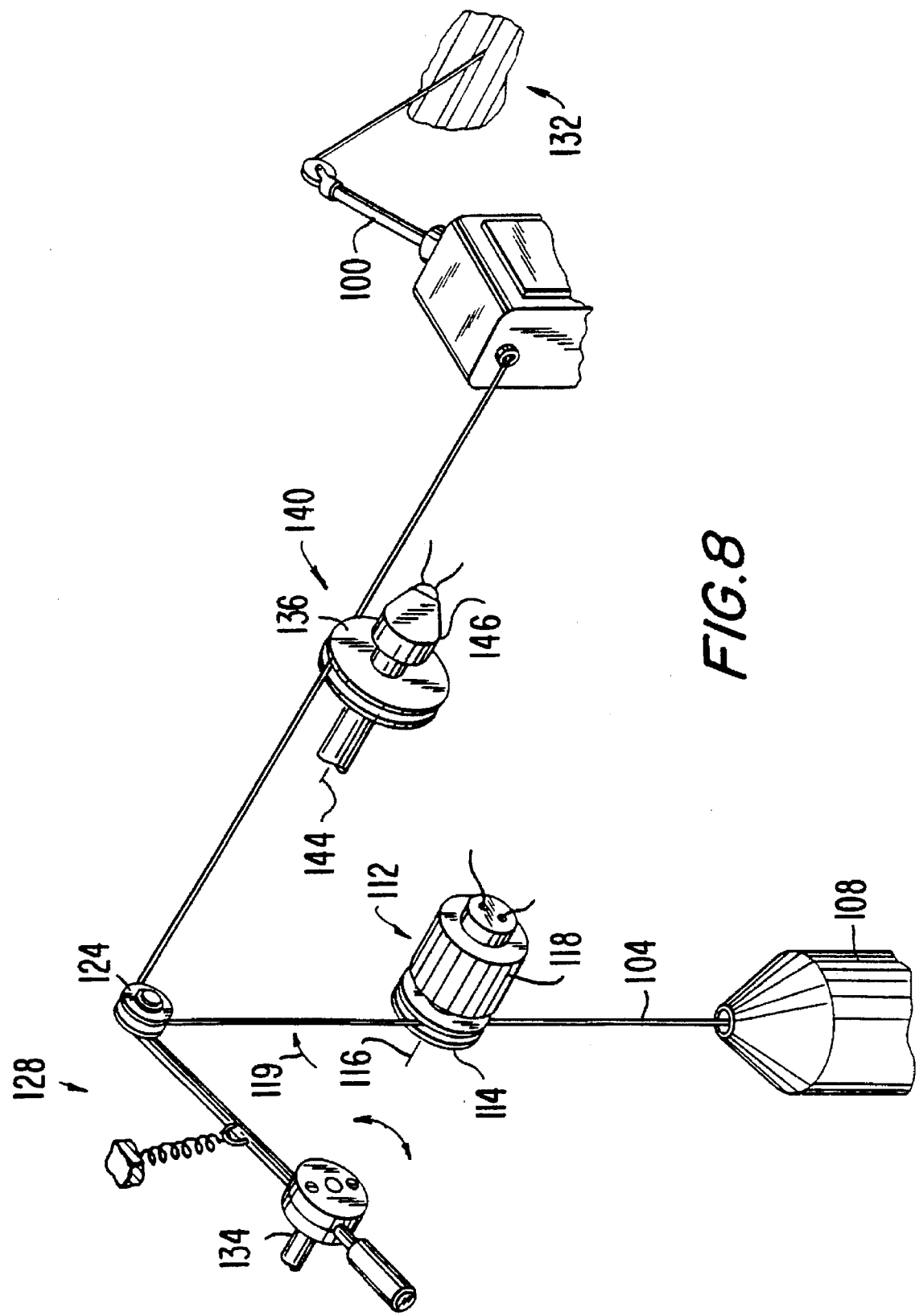
FIG. 8 is a simplified perspective view of one side of an illustrative armature winding apparatus constructed in accordance with the present invention.
Figure 9:
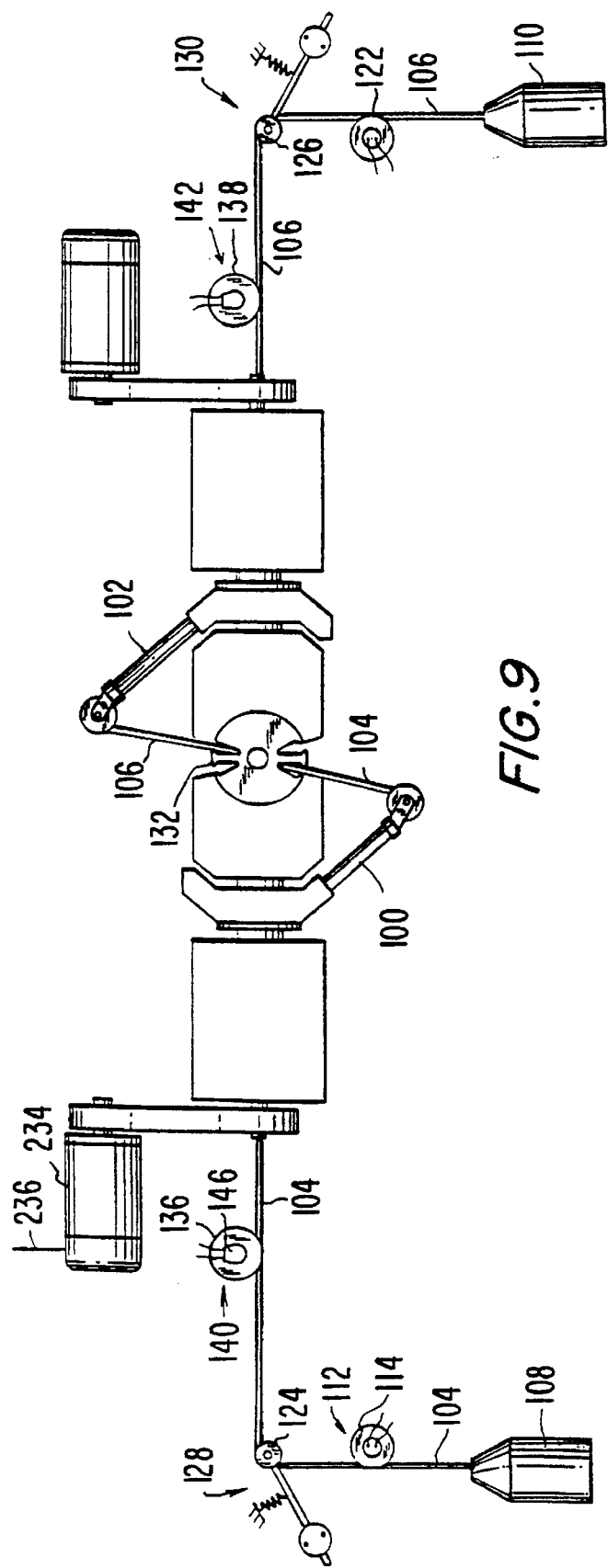
FIG. 9 is a simplified axial view of both sides of the illustrative armature winding apparatus of FIG. 8.

Equipment used with a first embodiment of the invention for a two flyer armature winding machine is shown in FIGS. 8 and 9. The equipment shown in FIG. 8 is that required for the flyer 100, which is also shown on the left side of FIG. 9. Similar equipment is provided for flyer 102 on the right side of FIG. 9.

Figure 10:
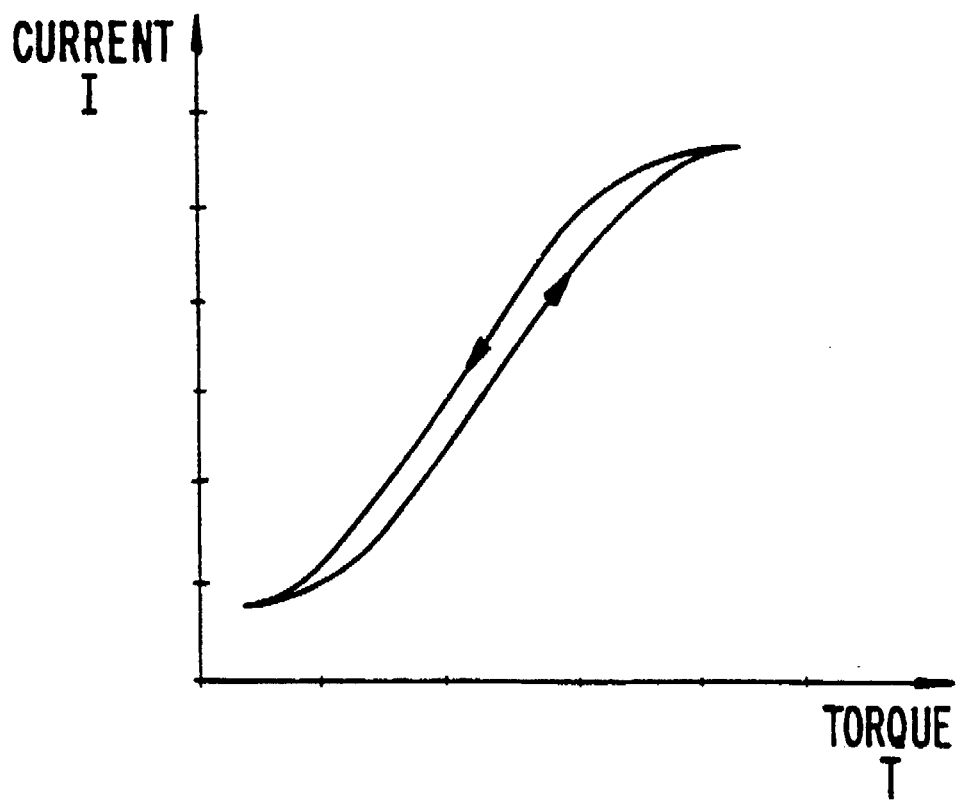
FIG. 10 is a typical current-torque relationship for a hysteresis brake.

As shown in FIGS. 8 and 9, wires 104 and 106 are supplied to flyers 100 and 102 from left and right spools 108 and 110, respectively. From spool 108, the wire leads to a wire tensioner 112. Wire tensioner 112 includes a pulley wheel 114 about which wire 104 is preferably wound for more than 360°. Pulley wheel 114 has a central shaft mounted on supports of the machine frame (not shown) for rotation about axis 116. The central shaft of pulley wheel 114 is rigidly connected to the input shaft of a hysteresis brake 118, which is capable of supplying variable drag torque on pulley wheel 114 when the pulley wheel is turned in direction 119 to supply wire to flyer 100. The drag torque provided by brake 118 can be varied by adjusting the electric current that is applied to the coils of the brake. FIG. 10 shows a typical performance curve for the hysteresis brake where current I is plotted against braking torque T. Brakes of this type are commercially available from Magtrol, Inc. of Buffalo, N.Y. Alternatively, wire tensioners of the type shown in commonly assigned U.S. Pat. No. 5,310,124 (incorporated by reference herein) can be employed if desired. As shown at the right side of FIG. 9, wire 106 passes through a wire tensioner 122, similar to that of wire tensioner 112.

After wire tensioners 112 and 122, wires 104 and 106 run over pulley wheels 124 and 126 of spring biased dancer arms 128 and 130, respectively, prior to reaching flyers 100 and 102. The wire tensioners 112 and 122 are used to ensure that wires 104 and 106 have sufficient tension to guarantee that the coils wound onto armature 132 are sufficiently compact. The wire tensioners also maintain control of the wires as they are drawn from the spools by rotation of the flyers.

The dancer arms are used to dampen the wire tension transients that accompany certain flyer operations, such as the operations required to connect wire leads to the commutator of armature 132. During these operations the flyers undergo abrupt changes in rotational direction and speed. The dancer arms pivot to accommodate any sudden tightening or loosening of the wire. For example, dancer arm 128 pivots about axle 134, shown in FIG. 8.

After passing pulley wheels 124 and 126, wires 104 and 106 pass through pulley wheels 136 and 138 of wire sensors 140 and 142, respectively. Wire sensors 140 and 142 are used to monitor the amount of wire that is wound onto the armature by flyers 100 and 102. Using a suitable control system, the amount of wire that is wound onto the armature by the respective flyers can be equalized to balance the armature.

As shown in FIG. 8, pulley wheel 136 is mounted to rotate about axis 144 by mounting its central shaft to the winding machine frame (not shown). The central shaft of pulley 136 is linked by means of a mechanical joint to the rotatable input of a suitable transducer, such as an encoder 146. Encoder 146 can supply output signals representing the rotations of pulley 136 about axis 144. For example, encoder 146 may produce an output pulse each time pulley 136 rotates by a predetermined amount. Wire 104 is preferably looped for more than 360° around pulley wheel 136 and a pressure wheel (not shown) may press on the wire to ensure that it does not slip as it runs on the pulley wheel. Wire sensor 140 is preferably located along the associated wire 104 downstream from the wire tensioner 112 and the dancer arm 128. Wire sensor 142 is preferably of similar construction to that of wire sensor 140.

During winding, wire 104 and 106 travels through wire sensors 140 and 142, respectively. Wire sensors 140 and 142 measure the amount of wire that has been wound onto the coils of armature 132. The amount of wire that has been wound onto the armature can be determined by using wire sensors 140 and 142 to measure rates of travel of the wires toward their respective flyers, or by measuring the length of wire consumed since some predetermined starting time, such as the beginning of winding of the pair of coils currently being wound.

In a preferred embodiment of the invention, the wire sensors are used to determine the lengths of the wires that are wound onto each respective coil in a pair of coils. The lengths of the wires wound onto the coils are compared to determine to what degree the wire tensioners 112 and 122 should be adjusted. For example, if it is determined that the second coil has a longer length of wire wound onto it than the first coil, then the tension applied to the wire leading to the second coil can be increased by increasing the retarding force applied to the wire with wire tensioner 122. When the next pair of coils is wound, the higher tension for the second coil will cause less wire to be wound onto the second coil than was previously wound, thereby tending to balance the armature.

The tension applied by wire tensioner 122 can be adjusted as appropriate, while the tension applied by wire tensioner 112 remains at a nominal value selected prior to winding. This type of arrangement is sometimes referred to as a "master-slave" configuration, where wire tensioner 112 acts as the master and wire tensioner 122 acts as the slave. Of course, wire tensioner 122 could be the master and wire tensioner 112 the slave, if desired. It is also possible to simultaneously adjust the tension applied by both wire tensioners 112 and 122.

Any suitable algorithm for adjusting the tensions applied by these devices can be employed. For example, the tension applied by one of the wire tensioners (the slave) can be increased or decreased in a linear fashion, based on the measured difference in wound coil lengths, as shown in Equation 1.

$$\text{New-Tension} = \text{Old-Tension} + c * (X_L - X_R) \qquad (1)$$

In Equation 1, New-Tension is the tension to be applied by the slave wire tensioner when the next pair of coils is wound. Old-Tension is the tension that was previously applied. $X_L$ and $X_R$ are the values of wire length measured by the wire sensors 140 and 142, respectively. The constant c is determined empirically. The value of c will typically depend on the type of armature being wound and the size and characteristics of the wire being used. Equation 1 is one suitable expression for determining the tension to be applied by the slave wire tensioner. It is also possible to use an expression that has a quadratic, cubic, or higher order dependency on the measured difference in wire lengths. A set of two expressions similar to Equation 1 (or its quadratic or higher order variants) can also be used if the tensions applied by both wire tensioners 112 and 122 are to be adjusted. The algorithm used to adjust the wire tensioners can be implemented by the control system of the winding machine using an equation such as Equation 1 stored either as a set of instructions to be executed by, e.g., a microprocessor, or as a look-up table stored in a suitable memory device.

The purpose of making the periodic adjustments to the wire tensioners 112 and 122 (preferably once per coil pair) is to is to reduce and ultimately substantially eliminate the difference between the lengths of the wires that are wound onto the armature to form the coils. This also typically has the effect of at least eventually reducing tension differences between the two wires. Equalizing the lengths (and therefore tensions) of the two wires wound onto the armature reduces differences which would exist in the two coil masses being wound, and also produces a similar compactness in the two coils. As has been described above, this balances opposing coils and thus the entire armature.

The winding machine arrangement shown in FIGS. 8 and 9 and described above is superior to previously-known winding machines because the wire sensors 140 and 142 are placed directly adjacent to the flyers, with no intervening tensioning equipment. The measured wire length more accurately reflects the mass of the wire that has been wound onto the armature, because when dancer arms 128 and 130 pivot a different amount of wire may be wound onto the armature than would be detected by measuring the wire consumption in the vicinity of the spool. Because wire sensors 140 and 142 are directly adjacent to the flyers 100 and 102, the actual length of wire wound onto the armature is measured.

Under extreme wire tensions, the motions of the dancer arms 128 and 130 and transients in the tensions of the wires as they are wound onto the armature can adversely affect the accuracy of the determination of the respective masses of the coils that are ultimately formed on the armature, even if the wire sensors are located adjacent to the flyer. This is because as the tension applied to the wire varies, the degree to which the wire is elongated varies. The more the wire is elongated, the lower its linear mass. Thus, even if the length of wire wound onto the armature is determined accurately, if the linear mass of the wire varies significantly, it may not be possible to determine the wire mass as accurately as desired using the winding apparatus of FIGS. 8 and 9.

Figure 11:
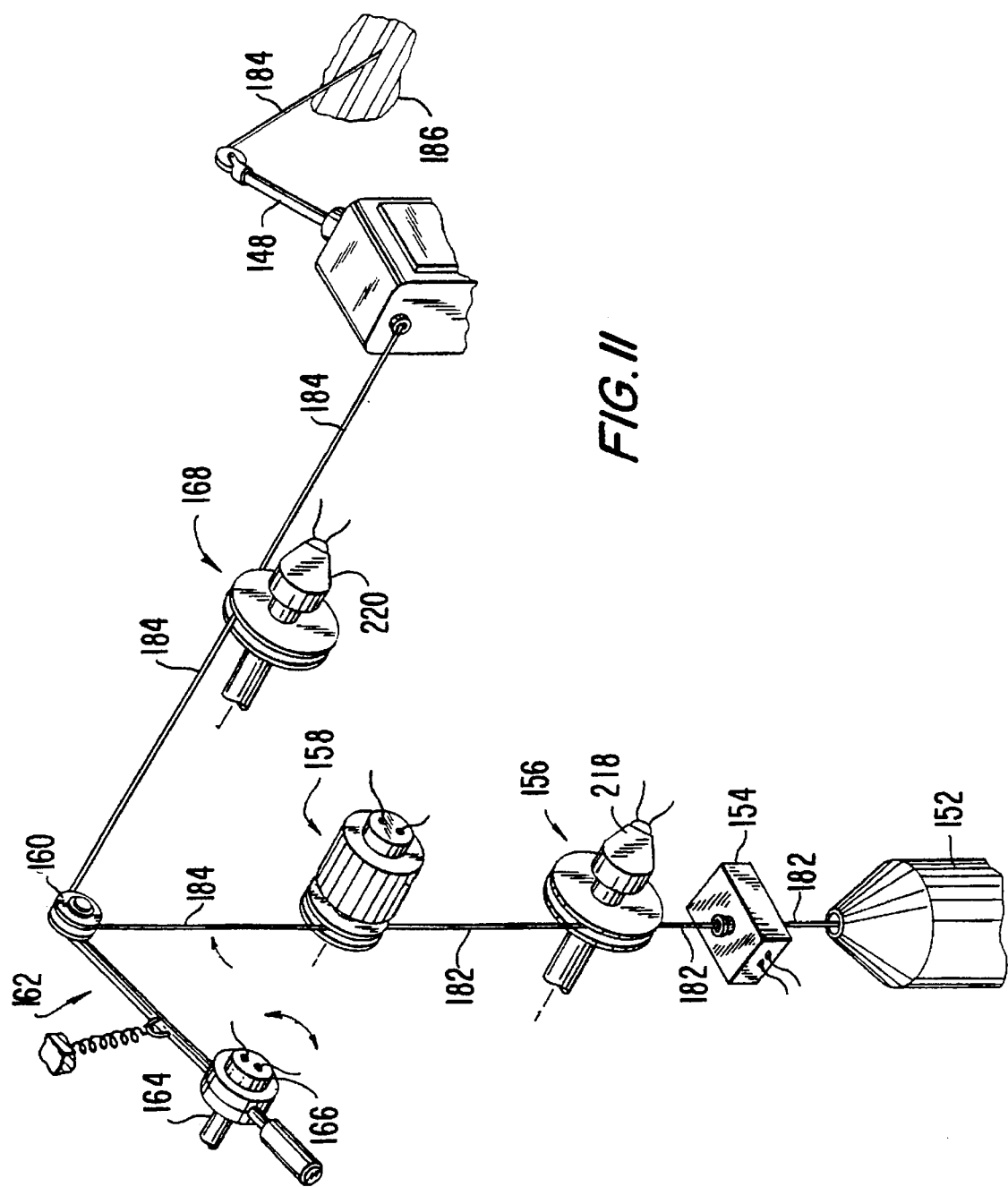
FIG. 11 is a simplified perspective view of one side of a further illustrative armature winding apparatus constructed in accordance with the present invention.
Figure 12:
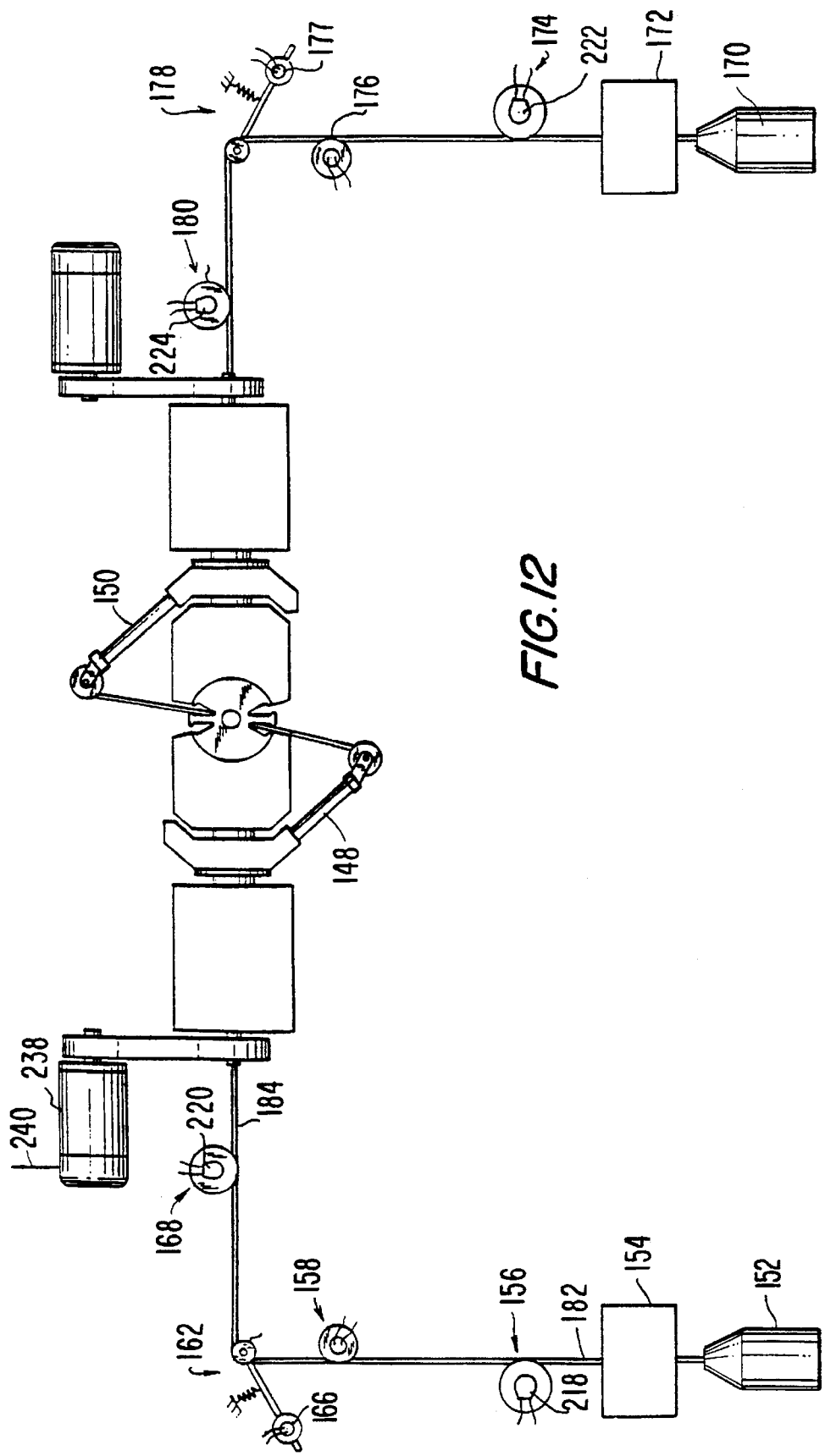
FIG. 12 is a simplified axial view of both sides of the illustrative armature winding apparatus of FIG. 11.

As shown in FIGS. 11 and 12, further wire sensors can be provided to allow both the amount of wire wound onto the armature and the linear mass of the wound wire to be determined. As with the winding machine arrangement of FIGS. 8 and 9, two similar sets of equipment are used, one for each of the flyers 148 and 150. The equipment in FIG. 11 is used for flyer 148.

Spool 152 supplies wire, whose diameter can be measured using an optional wire thickness gauge 154. Wire thickness gauges are well known. A typical gauge contains a source of illumination, such as a laser, which produces a beam of light perpendicular to the wire. The wire passing through the gauge intersects the beam allowing the diameter of the wire to be determined.

A wire sensor 156 measures the amount of wire that is supplied from the spool. Wire sensor 156 operates similarly to wire sensor 140 (FIG. 8). Wire sensor 156 is used to periodically measure the rate of travel of the wire toward the flyer. After wire sensor 156, the wire passes though wire tensioner 158, which can be constructed similarly to that of wire tensioner 112 (FIG. 8).

The wire passes through pulley wheel 160 of dancer arm 162, which is of the same type as dancer arm 128 (FIG. 8). Dancer arm 162 pivots about the axis of shaft 164 to accommodate abrupt changes in the tension of the wire. A position sensor having an encoder 166 can be used to determine the rotational position of dancer arm 128. After pulley wheel 160 the wire passes to flyer 148 via wire sensor 168, which is preferably constructed similarly to wire sensor 156. The winding machine parts shown on the right side of FIG. 12—spool 170, wire gauge 172, wire sensor 174, wire tensioner 176, encoder 177, dancer arm 178, and wire sensor 180—are used with flyer 150.

The addition of wire sensor 156 and encoder 166 allow the mass of the wires wound onto the armature to be accurately determined, even if extreme wire tensions and large movements of the dancer arms 162 and 178 are encountered. The mass of any segment of wire wound onto the coil is equal to the linear mass (mass per unit length) of the wire integrated over the length of the wire segment. Because the wire elongates under tension, the linear mass of wire that has been tensioned is less than the wire emerging from the spool. As shown in FIG. 11, wire segment 182, which extends from spool 152 to wire tensioner 158, is relatively untensioned. Between the wire tensioner 158 and the armature 186, wire segment 184 is tensioned by the actions wire tensioner 158, dancer arm 162 and flyer 148.

Although the linear mass of the wire changes under tension, overall mass is conserved. The principal of conservation of wire mass is embodied in Equation 2.

$$G1(t)\ V1(t) = G2(t)\ (V2(t) + VD(t)) \quad (2)$$

In Equation 2, G1 is the linear mass of wire segment 182 and G2 is the linear mass of wire segment 184. V1 and V2 are the velocities of the wire at the wire sensors 156 and 168, respectively. The variable VD is the rate of change in the length of the portion of wire segment 184 that is between wire tensioner 158 and wire sensor 168 (i.e. the change in the length of the wire supported by the dancer arm 16 per unit time).

The total mass of a wire segment that is wound onto the armature, M, is given by Equation 3, where T is the period of time taken to wind the wire segment onto the armature.

$$M = \int_O^T \frac{G}{T} 2(t) V2(t) dt \quad (3)$$

As described below, the values of G1, V1, V2, and VD are known, so that the value of G2 can be obtained from Equation 2. The total mass of the wire segment wound onto the armature can then be obtained from Equation 3. By comparing the mass wound onto the armature by flyer 148 to that of the mass wound by flyer 150, the wire tensioners 158 and 176 can be adjusted appropriately to balance the armature.

The values of G1, V1, V1, and VD can be determined using the various sensors shown in FIG. 11. As the flyer draws wire from spool 152, the linear mass of wire segment 184 may vary slowly due to variations in the diameter of the wire. These variations can be sensed by the wire thickness gauge 154 to determine the value of G1 as a function of time. Alternatively, because the nominal wire diameter does not vary substantially, G1 can be assumed to be a constant.

The value of V1 can be obtained from the wire sensor 156. Similarly, the value of V2 can be obtained from the wire sensor 168. The rate of change in the length of the wire segment supported by the dancer arm, VD, can be determined based on the known length of that wire segment as a function of the position of dancer arm 162 and the measured value of that position, which is provided by encoder 166.

The equipment shown in FIG. 11 and on the left of FIG. 12 is used with flyer 148 to wind the wire onto the armature and to determine the total mass of any given segment of wire that is wound. The components on the right side of FIG. 12 are used to perform the same functions with flyer 150. By periodically comparing the total masses of the respective wire segments that have been wound onto the armature, the wire tensioners can be periodically adjusted to equalize the masses delivered to opposing armature coils, thereby balancing the armature.

Any suitable algorithm can be used to adjust the wire tensions provided by wire tensioners 158 and 176. For example, a linear algorithm, such as that defined by Equation 1, or a quadratic or higher order algorithm can be used. The coefficients for the various terms in the algorithm can be determined empirically for various wire and armature types. One suitable algorithm for determining to what extent the wire tensioners 158 and 176 should be adjusted is given by Equations 4 and 5.

$$TR = T0 + k * (MR - ML)/(MR + ML) \quad (4)$$

$$TL = T0 - k * (MR - ML)/(MR + ML) \quad (5)$$

In Equations 4 and 5, MR and ML are the respective masses of two opposing wire segments that have been wound onto the armature. The measurements necessary to determine MR and ML are made using the sensors shown on the right and left of FIG. 12, respectively. The winding machine control system determines MR and ML based on these measurements using Equation 3. TR and TL are the tensions to be applied by wire tensioners 158 and 176 in response to the values obtained for MR and ML. T0 is the nominal tension value, one which has been shown to generally produce satisfactory results. The constant k can be determined empirically for various combinations of wire type and armatures.

Similarly, a suitable winding machine arrangement such as the machine shown in FIGS. 8 and 9 can also use a torque adjustment algorithm based on Equations 4 and 5, if desired. With such an arrangement, sensors 140 and 142 can be used to monitor the wire lengths that are wound onto successive coils. After winding each pair of coils, the measured lengths can be compared. The respective tensions to be applied to the wires when winding the next set of coils can then be adjusted with wire tensioners 112 and 122 using Equations 4 and 5.

Figure 13:
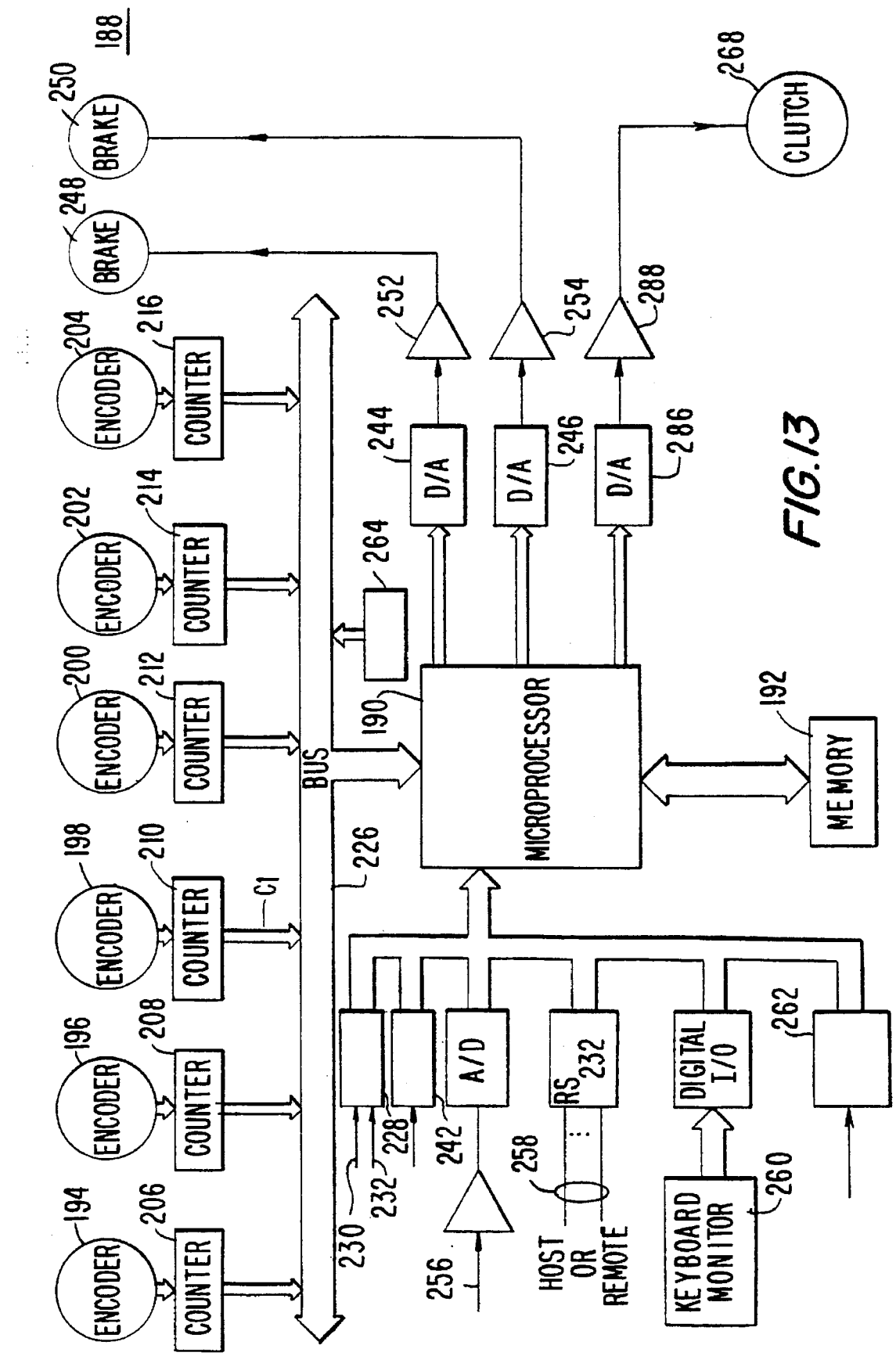
FIG. 13 is a schematic block diagram of an illustrative control system constructed in accordance with the present invention.

Any suitable control system may be used to perform the processing necessary to determine the masses of respective wire segments from the sensor readings and to control the operation of the winding machine. For example, dedicated circuitry could be used. Another suitable control system design is based on a microprocessor. An illustrative microprocessor-based control system is shown in FIG. 13. Control system 188 uses microprocessor 190 to execute instructions loaded into memory 192. By executing the appropriate instructions, microprocessor 190 processes the signals from the various winding machine sensors and implements the control routines necessary to balance the armature during winding.

If the wire sensors used to measure the amount of wire being wound onto the armature are of the type that produce a certain number of digital pulses per revolution of a pulley wheel, these pulses must be processed. One suitable approach for processing these sensor signals is to count the signals from the wire sensor encoders per unit time, thereby allowing the control system 188 to determine the necessary wire velocities.

For example, the pulses from encoders 194, 196, 198, 200, 202, and 204 can be counted by counters 206, 208, 210, 212, 214, and 216, respectively. If a sensor arrangement such as that shown in FIGS. 11 and 12 is used, six counters can be used to count the various signal pulses from the six encoders 218, 166, 220, 222, 177, and 224. Data from the counters is provided to the microprocessor 190 via bus 226. The microprocessor 190 can process the counter data to determine the velocities V1, V2, and VD.

If the sensor arrangement is similar to the arrangement shown in FIGS. 8 and 9, then two counters can be used to count the signal pulses from encoders 140 and 142. The microprocessor 190 can then process the counter data to determine the length of wire that has been drawn past each wire sensor.

The output of the wire gauges 154 and 172 can be provided to microprocessor 190 via a suitable interface device 228. Interface device 228 can be, for example, a multi-channel analog-to-digital converter that receives the outputs from wire gauges 154 and 172 at inputs 230 and 232, respectively. Alternatively, interface device 228 can be a digital interface capable of receiving digital signals from the wire gauges that are indicative of the measured wire thicknesses.

Another signal that may be provided to the microprocessor 190 is a position signal from one of the flyer drives. For example, flyer drive 234 (FIG. 9) can provide a position signal at output 236 or flyer drive 238 can provide a position signal at output 240. The position signal from the flyer drive, which is indicative of flyer rotation or angular position, can be provided to microprocessor 190 via a suitable interface device 242.

The control system 188 processes the signals from the various sensors and determines the magnitude of any adjustments to be made to the tensions that are applied by the wire tensioners using any suitable algorithm, as described above. The control system 188 generates corresponding digital control signals, which are provided to digital-to-analog converters 244 and 246. Digital-to-analog converters 244 and 246 convert the digital control output signals to the analog form typically required by wire tensioners such as hysteresis brakes 248 and 250, to modify the torque they apply and thereby adjust the tension of the wires. Prior to being supplied to the brakes, these signals can be amplified by amplifiers 252 and 254.

Line 256 can be used for entering ideal wire tensions, e.g., using potentiometers to supply analog signals that are transformed to digital signals for microprocessor 190.

Lines 258 can make up a serial link coming from a host or remote controller which can be the winder's ultimate controller, so that when setting the winder for a particular type of armature, the ideal tension is automatically transferred to microprocessor 190 without requiring any further local input. Keyboard and monitor 260 are alternative input devices which an operator can use to supply the required tension conditions.

Although the wire and position sensors that have been described have encoders to generate a number of output pulses per revolution that can be counted by respective counters, any suitable sensor arrangement for sensing the amount of wire consumed or the position of the dancer arm can be used. For example, sensors can be provided that contain counters and processing circuitry. If the sensors contain such additional circuitry, the signals transmitted from the sensors to the control system 188 are more directly indicative of the parameter being measured. A wire sensor output might be an analog or digital signal having a value equal to the length of wire consumed or the velocity of the wire. Similarly, a position sensor for determining the position of the dancer arm could provide an analog or digital output signal that indicates the position and velocity of the dancer arm. Further, although the counters in FIG. 13 are shown connected to microprocessor 190 via bus 226, the analog or digital output signals from the various sensors could alternatively be supplied to microprocessor 190 via suitable interface circuitry 262.

Similarly, although the wire gauge sensors, the flyer drivers, the circuitry for entering the wire tension, the host, and the keyboard and monitor are shown connected directly to the microprocessor 190, the outputs of some or all of these can be provided to microprocessor 190 via suitable interface circuitry 264 connected to bus 226, if desired.

Another aspect of the present invention relates to improvements to the wire tensioning arrangement used to tension the wire as it is wound onto a wound electric motor component (e.g., a rotor or stator) for a dynamo-electric machine. As described above, one suitable type of wire tensioner is based on a hysteresis brake. Typically, hysteresis brakes have an axle connected to a rotor that rotates within a stationary stator. By varying the current supplied to the field coils of the stator, a variable torque is applied to the axle.

The hysteresis brakes used with the wire winding machines described above have pulley wheels about which wire to be tensioned is wound. As the flyer draws wire past the hysteresis brake, the pulley wheel rotates. When a current is supplied to the field coils of the stator, a retarding torque is generated by the brake. The torque applied by the brake is a function of the current supplied to the brake, generally following the relationship shown in FIG. 10.

However, it is often difficult to use hysteresis brakes for wire tensioning in a winding machine. During the process of winding, it is often necessary to quickly reduce the torque applied by the brake. For example, when a coil has been wound and the flyer stops rotating in order to form lead connections, the torque generated by the brake must be reduced prior to forming the lead connections so that the lead connections can be formed properly.

It is not possible, however, to simply reduce the current that is supplied to the stator at this point, because hysteresis brakes suffer from a phenomenon known as "cogging," in which the torque applied by the brake remains high, even after the controlling current has been reduced. The cogging phenomenon is well known. Because of this phenomenon, the torque applied by the brake will not decrease to the desired level until the rotor has rotated at least a certain angle relative to the stator. Generally, the rotor must rotate an angle of rotation equal to the angular separation between two poles. Because the torque remains high due to cogging, as the lead connections are formed, they are exposed to a larger wire tension than is desired, which can prevent the lead connections from being formed properly or which can cause the wire to break.

Figure 14:
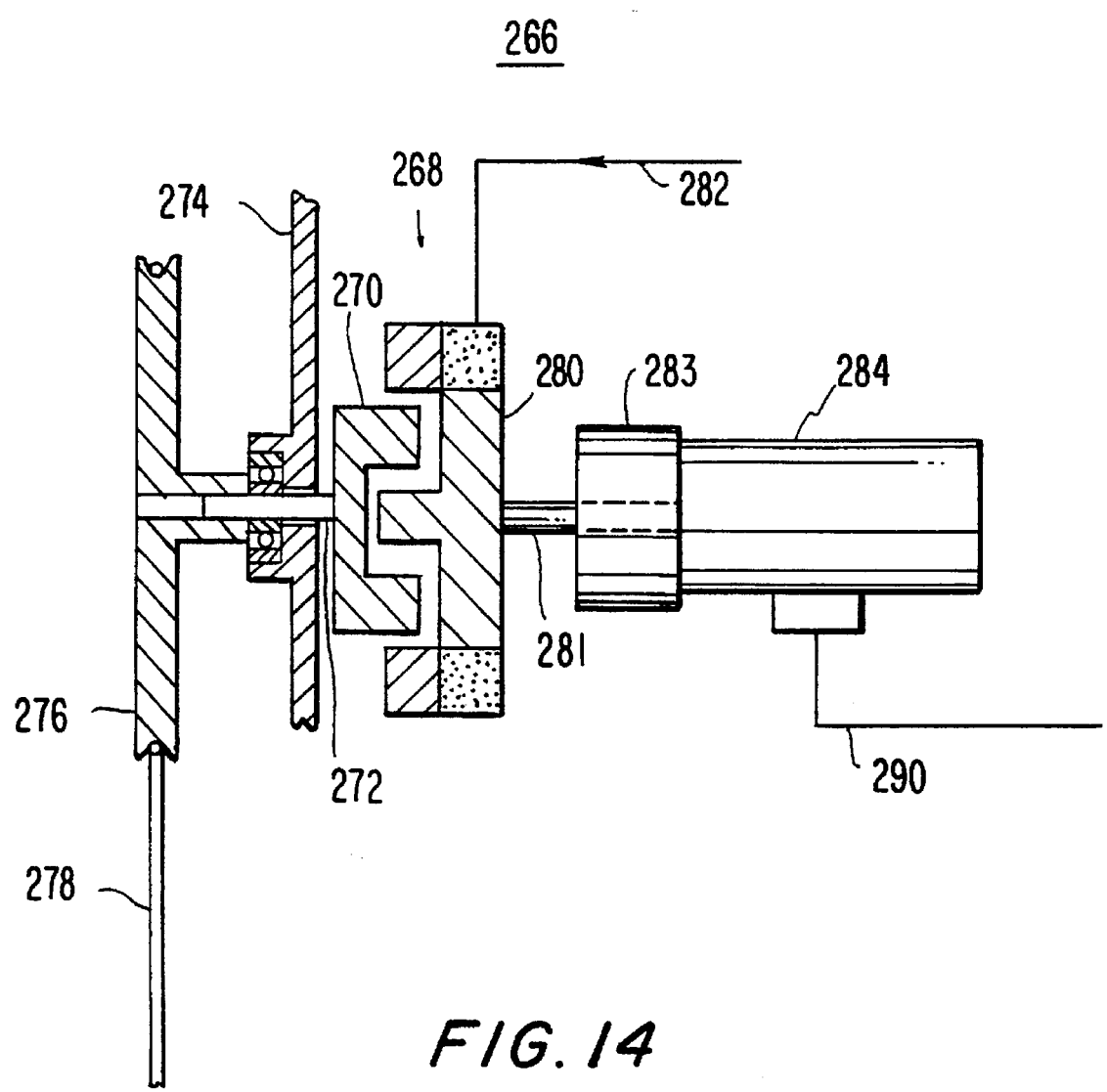
FIG. 14 is a simplified sectional side view of a hysteresis brake unit constructed in accordance with the present invention.

In accordance with the present invention, a wire tensioner 266 is provided having a hysteresis clutch 268, as shown in FIG. 14. Preferably, hysteresis clutch 268 is a clutch such as a clutch in the HCS series of clutch models available from Magtrol Inc. of Buffalo, N.Y. Hysteresis clutch 268 has a rotor 270 that is connected to an axle 272, which is rotatably mounted in stationary housing 274. A pulley 276 or similar member for engaging wire 278 is connected to axle 272.

Clutch 268 receives a controlling current via input 282. Rotating stator 280 is rotated relative to the stationary housing 274 by motor 284 using axle 281. The actual speed of rotation of the rotating stator 280 is preferably reduced from the speed of rotation of the motor 284 by reduction gear 283. Preferably motor 284 is a fixed speed AC motor that receives a drive voltage via input 290. Pulley 276 typically rotates so as to feed wire toward the electric motor component to be wound. Rotating stator 280 rotates in the opposite direction.

The hysteresis clutch 268 provides a retarding torque to the pulley wheel 276. The magnitude of the retarding torque is primarily determined by the value of the current applied to the hysteresis clutch 268 via input 282. By varying the current supplied to input 282, the wire 278 can be tensioned as desired.

When it is desired to lower the torque applied by wire tensioner 266, the current supplied to input 282 is reduced to the desired level. Using reduction gear 283 and axle 281, motor 284 rotates rotating stator 280 relative to rotor 270 by an angular amount that is preferably sufficient to overcome the effects of cogging. The torque produced by the hysteresis clutch 268 is therefore immediately reduced to a value corresponding to the reduced current level. The ability to rapidly lower the torque applied to the wire precisely when desired allows the retarding torque provided by pulley wheel 276 to be reduced prior to the portion of the winding process that involves forming lead connections. Thus, the tension of the wire during winding can be controlled with the wire tensioner 266 to avoid undesirable high tensions that previously occurred during the lead connection process.

Figure 15:
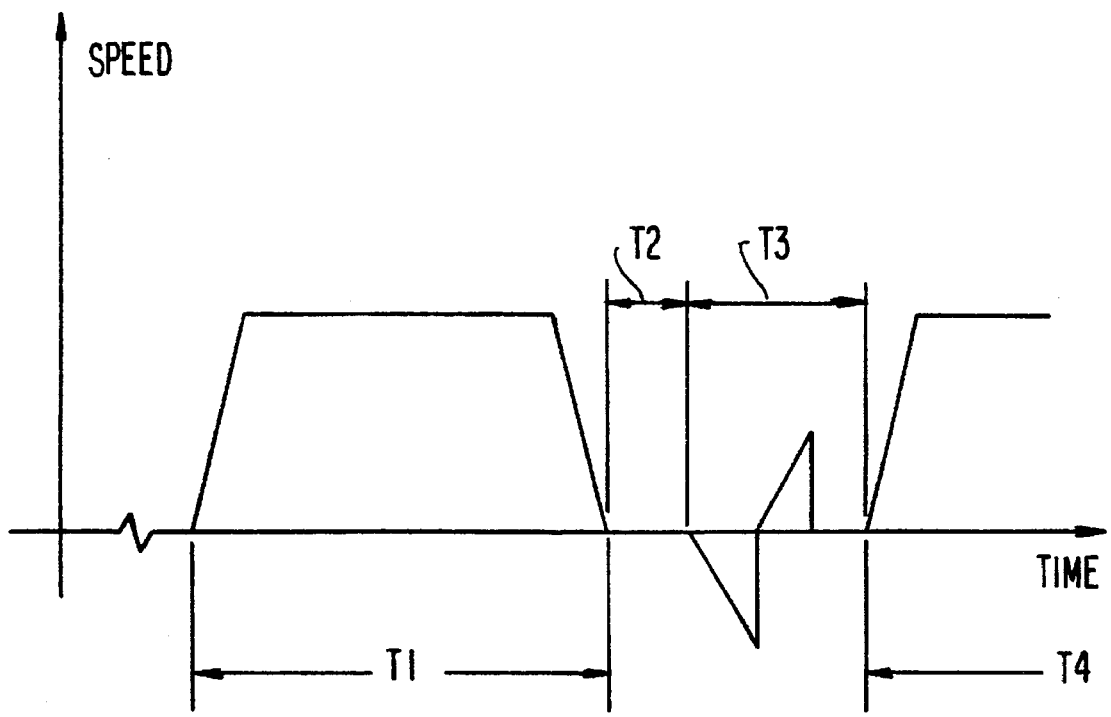
FIG. 15 is an illustrative timing diagram of the speed of rotation of a winding machine flyer versus time.

The speed of rotation of a typical winding machine flyer during the process of winding an armature is shown in FIG. 15. During time period T1, the flyer winds wire onto a first armature coil. During time period T2, the flyer is stationary while the winding machine moves the appropriate lead connection point into position. As described above, it is desired that the torque applied to the wire during the process of forming lead connections be relatively low. Accordingly, during period T2, the current supplied to the wire tensioner 266 via input 282 is reduced. The rotation of motor 284 causes the rotating stator 280 to rotate relative to rotor 270, which eliminates the effects of cogging. The torque applied by the wire tensioner 266 during period T2 therefore quickly drops to a relatively low level. During time period T3, the winding machine performs various lead connection operations. (As shown in FIG. 15, during time period T3 the direction of rotation of the flyer may reverse.) Because the torque applied by wire tensioner 266 was lowered during period T2, the lead connections during period T3 can be formed without deforming the lead connections (e.g., without bending the tangs of a commutator). Another winding cycle, in which a second coil is wound, begins with time period T4. An advantage of this approach is that rotation of the rotating stator 280 by motor 284 can be accomplished during period T2 prior to the lead connection step. No additional time is required to complete the winding cycle.

As described above, a significant advantage of using hysteresis clutch 268 in wire tensioner 266 is that the motor 284 can be used to rotate the rotating stator 280 relative to the rotor 270 to overcome the effects of cogging. Another significant advantage of using hysteresis clutch 268 in wire tensioner 266 is that the direction of rotation of the pulley wheel 276 can be reversed to pick up slack that may develop at certain stages in the winding process.

During most winding operations, the pulley wheel is rotated in a forward direction by the force of the wire being drawn past it towards the electric motor part being wound (e.g, the armature or stator), while the motor 284 rotates the rotating stator in the opposite direction. However, occasionally it is desirable to for the direction of the pulley wheel to reverse, in order to pick up slack that has developed in the wire and to maintain an appropriate tension on the wire. For example, during certain stages of armature winding, the motion of the flyer may create slack in the wire between the pulley wheel and the armature. When this occurs, the retarding torque applied to the pulley wheel 276 by the hysteresis clutch 268 causes the pulley wheel to reverse its direction of rotation, while the motor 284 continues to rotate the rotating stator 280, so that instead of allowing slack to develope in the wire, the pulley wheel draws wire back from the armature. During winding, the torque applied to the pulley wheel 276 by hysteresis clutch 268 can be increased or decreased by increasing or decreasing the current applied to the clutch 268, if desired. Typically, dancer arms are provided upstream from the pulley wheel to recover any wire that is drawn back from the direction of the wound motor component.

Another situation in which slack may develop in the wire being wound onto the electric motor component occurs during stator winding. Robotic wire manipulation devices are typically used to position the ends of the coil leads as they are connected to terminals on stators or anchoring points on workpiece holders. These robotic manipulators position wires in a way that makes it desirable to be able to draw wire back towards the pulley wheel. The retarding torque applied to the pulley wheel 276 causes the direction of rotation of the pulley wheel to reverse whenever wire slack develops, while motor 284 continues to rotate the rotating stator 280. Further, during the process of forming lead connections to stator terminals, it may be desirable to increase the retarding torque so that, in addition to removing slack from the wire, a sufficient tension is developed in the wire to form a tight lead connection. This can be accomplished by increasing the value of the control current to the hysteresis clutch 268 at the appropriate time during the lead connection process. The increased control current increases the torque applied to the pulley wheel 276 by the hysteresis clutch 268, so that the knot can be formed as desired.

If wire tensioner 266 uses a hysteresis clutch, the hysteresis clutch 268 is preferably controlled by control system 188 (FIG. 13). Microprocessor 190 executes instructions stored in memory 192 that direct the microprocessor to generate appropriate digital motor control signals, which are provided to digital-to-analog converter 286. The analog output of digital-to-analog converter 286 can be amplified by an amplifier 288, if desired. The output of amplifier 288 is preferably an analog control signal that can be used to control the torque applied to pulley wheel 276 by hysteresis clutch 268, by supplying a suitable input control current at input 282, as shown in FIG. 14. If desired, a similar digital-to-analog converter and amplifier may be provided to generate the control voltage applied to input 290 of motor 284 (FIG. 14).

It will be understood that the foregoing is merely illustrative of the principles of this invention, and that various modifications can be made by those skilled in the art without departing from the scope and spirit of the invention. For example, although the invention has been illustrated in the context of flyer type winders, the invention is equally applicable to winders having other types of wire dispensing members such as those shown in above-mentioned U.S. Pat. No. 5,413,289. Similarly, although the use of hysteresis brakes has been described, other types of wire tensioners (e.g., those shown in above-mentioned U.S. Pat. No. 5,310,124) are known and can be employed if desired.

The invention claimed is:

1. Apparatus for simultaneously winding two coils of wire onto a rotor for use in a dynamo-electric machine comprising:

first and second wire supplies for respectively supplying first and second wires;

first and second winders for respectively winding said first and second wires onto said rotor;

first and second means for respectively monitoring the lengths of said first and second wires that are wound onto said rotor during a predetermined period of time;

first and second means for respectively applying tension to said first and second wires; and means responsive to said first and second means for monitoring for adjusting the tension applied by at least one of said first and second means for applying tension in order to substantially equalize the lengths of said first and second wires wound onto said rotor during a subsequent one of said predetermined periods of time, wherein said first and second means for monitoring are respectively downstream along said first and second wires from said first and second means for applying tension.

2. The apparatus defined in claim 1 wherein said predetermined period of time is the length of time necessary to wind said two coils.

3. The apparatus defined in claim 1 wherein said first and second means for applying tension comprise respective first and second hysteresis brakes.

4. The apparatus defined in claim 1 wherein said first and second means for monitoring respectively comprise:

first and second rotatable members respectively in contact with said first and second wires so that each of said first and second members rotates at a rate indicative of the rate at which the wire in contact with it is passing; and first and second digital encoding means respectively associated with said first and second rotatable members so that each of said first and second encoding means produces an output signal pulse each time the associated rotatable member rotates by a predetermined amount.

5. The apparatus defined in claim 4 wherein said means for adjusting comprises:

means responsive to the output signal pulses produced by said first and second digital encoding means for detecting any difference between the numbers of output signal pulses produced by said first and second digital encoding means.

6. The apparatus defined in claim 5 wherein, when said means for detecting detects a difference between the numbers of output signal pulses produced by said first and second digital encoding means, said means for detecting identifies which of said first and second digital encoding means has produced more of said output signal pulses, and wherein said means for adjusting further comprises:

means for producing a relative increase in the tension of the wire associated with the digital encoding means that has produced more of said output signal pulses.

7. Apparatus for simultaneously winding two coils of wire onto a rotor for use in a dynamo-electric machine comprising:

first and second wire supplies for respectively supplying first and second wires;

first and second winders for respectively winding said first and second wires onto said rotor during a predetermined time period, thereby forming first and second wire masses on said rotor;

first and second means for respectively applying tension to said first and second wires as said first and second wires pass said first and second means for applying tension, wherein said first and second means for applying tension are downstream along said wires from said first and second wire supplies and are upstream from said first and second winders;

first and second means for respectively monitoring the rates at which said first and second wires are fed toward said first and second winders past said first and second means for monitoring, wherein said first and second means for monitoring are respectively downstream along said wires from said first and second means for applying tension;

third and fourth means for respectively monitoring the rates at which said first and second wires are fed toward said first and second winders past said third and fourth means for monitoring, wherein said third and fourth means for monitoring are respectively upstream along the wires from said first and second means for applying tension;

first and second means for respectively further tensioning said first and second wires, said first and second means for further tensioning respectively supporting first and second lengths of said first and second wires, wherein said first and second means for further tensioning are respectively upstream along said wires from said first and second means for monitoring and are downstream from said first and second means for applying tension;

fifth and sixth means for respectively monitoring the rate of change of said first and second lengths of said wires supported by said means for further tensioning; and means responsive to said first, second, third, fourth, fifth, and sixth means for monitoring for adjusting the tension applied by at least one of said first and second means for applying tension in order to substantially equalize said first and second wire masses during a subsequent one of said predetermined periods of time.

8. The apparatus defined in claim 7 wherein said predetermined period of time is the length of time necessary to wind said two coils.

9. The apparatus defined in claim 7 wherein said first and second means for applying tension comprise respective first and second hysteresis brakes.

10. The apparatus defined in claim 7 wherein said first and second means for monitoring respectively comprise:

first and second rotatable members in respective contact with said first and second wires so that said first and second members rotate at rates indicative of the respective rates at which the first and second wires are passing said first and second rotatable members; and first and second digital encoding means respectively associated with said first and second rotatable members so that said first and second digital encoding means produce respective output signal pulses each time the first and second rotatable members rotate by a predetermined amount.

11. The apparatus defined in claim 10 wherein said third and fourth means for monitoring respectively comprise:

third and fourth rotatable members in respective contact with said first and second wires so that said third and fourth members rotate at a rate indicative of the respective rates at which the first and second wires are passing said third and fourth rotatable members; and third and fourth digital encoding means respectively associated with said third and fourth rotatable members so that said third and fourth digital encoding means produce respective output signal pulses each time the third and fourth rotatable members rotate by a predetermined amount.

12. The apparatus defined in claim 11 wherein said first and second means for further tensioning respectively comprise:

first and second dancer arms mounted for pivoting about respective first and second axes, said first and second dancer arms having respective first and second pulleys for engaging said first and second wires.

13. The apparatus defined in claim 12 wherein said fifth and sixth means for monitoring respectively comprise:

fifth and sixth digital encoding means respectively associated with said first and second dancer arms so that said fifth and sixth digital encoding means produce respective output signal pulses each time the first and second dancer arms pivot about said first and second axes by a predetermined amount.

14. The apparatus defined in claim 7 wherein said means for adjusting further comprises:

means for producing a relative increase in the tension of the wire associated with the larger of the two wire masses.

15. The apparatus defined in claim 7 further comprising a wire thickness gauge adjacent to each wire supply for determining the diameters of the first and second wires.

16. A method for simultaneously winding two coils of wire onto a rotor for use in a dynamo-electric machine, each of said coils being wound by a respective one of first and second winders respectively supplied with first and second wires from first and second wire supplies, said method comprising the steps of:

applying tension to said first and second wires with first and second wire tensioners;

monitoring the respective first and second lengths of said first and second wires that are wound onto said rotor during a predetermined time using respective first and second wire monitors, said first and second wire monitors being located between said respective first and second wire tensioners and said respective first and second winders; and adjusting the tension applied by at least one of said wire tensioners to equalize the first and second lengths of said wire that are wound onto said rotor during a subsequent predetermined period of time.

17. The method defined in claim 16 wherein said predetermined period of time is the length of time necessary to wind said two coils.

18. The method defined in claim 16 wherein said step of applying tension comprises the step of applying tension with first and second hysteresis brakes.

19. The method defined in claim 18 wherein said step of monitoring the respective first and second lengths comprises the step of:

allowing first and second rotatable members in respective contact with said first and second wires to rotate so that said first and second members rotate at respective first and second rates that are indicative of the respective rates at which the first and second wires are passing said first and second rotatable members; and encoding said first and second respective rates associated with said first and second rotatable members to produce an output signal pulse each time an associated rotatable member rotates by a predetermined amount.

20. The method defined in claim 19 wherein the step of adjusting the tension comprises the steps of:

processing the output signal pulses to determine said first and second lengths of said wire;

comparing said first and second lengths of wire; and increasing the tension applied to the wire corresponding to the longer of said first and second lengths.

21. A method for simultaneously winding two coils of wire onto a rotor for use in a dynamo-electric machine, comprising the steps of:

supplying first and second wires from first and second wire supplies;

winding said first and second wires onto said rotor using respective first and second winders for a predetermined time period, thereby forming corresponding first and second wire masses on said rotor;

applying tension to said first and second wires with first and second wire tensioners;

monitoring first and second respective rates at which said first and second wires are fed toward said first and second winders using respective first and second wire monitors located respectively between said first and second wire tensioners and said first and second winders;

monitoring third and fourth respective rates at which said first and second wires are fed toward said first and second winders using third and fourth wire monitors located respectively between said first and second wire tensioners and said first and second wire supplies;

further tensioning a first length of said first wire between said first wire tensioner and said first wire monitor and a second length of said second wire between said second wire tensioner and said second wire monitor, said first length of wire having a fifth rate of change of length and said second length of wire having a sixth rate of change of length;

monitoring said fifth and sixth rates; and adjusting the tension applied by at least one of said wire tensioners based on said monitored first, second, third, fourth, fifth, and sixth rates to equalize subsequently formed ones of said first and second wire masses.

22. The method defined in claim 21 wherein said predetermined period of time is the length of time necessary to wind said two coils.

23. The method defined in claim 22 wherein the step of applying tension to said first and second wires comprises the step of applying tension with respective first and second hysteresis brakes.

24. The method defined in claim 23 wherein the step of monitoring said first and second rates comprises the step of:

allowing first and second rotatable members in respective contact with said first and second wires to rotate at respective first and second rates that are indicative of the rates at which the first and second wires are passing said first and second rotatable members; and encoding said first and second respective rates associated with said first and second rotatable members to produce an output signal pulse each time the first and second rotatable members rotate by a predetermined amount.

25. The method defined in claim 24 wherein the step of monitoring said third and fourth rates comprises the step of:

allowing third and fourth rotatable members in respective contact with said first and second wires to rotate at respective third and fourth rates that are indicative of the rates at which the first and second wires are passing said third and fourth rotatable members; and encoding said third and fourth respective rates associated with said third and fourth rotatable members to produce an output signal pulse each time the third and fourth rotatable members rotate by a predetermined amount.

26. The method defined in claim 25 wherein the step of further tensioning said wire comprises the step of supporting said first and second lengths of wire on respective pulleys mounted on first and second dancer arms.

27. The method defined in claim 26 wherein the step of monitoring the fifth and sixth rates comprises the step of monitoring the fifth and sixth rates with respective fifth and sixth digital encoders so that said fifth and sixth digital encoders produce respective output signal pulses each time the first and second dancer arms pivot by a predetermined amount.

28. The method defined in claim 27 wherein the step of adjusting the tension comprises the steps of:

processing the output signals pulses to determine the first and second wire masses; and increasing the tension applied to the wire corresponding to the larger of the first and second wire masses.

29. The method defined in claim 21 further comprising the step of measuring the wire diameters of said first and second wires as said first and second wires respectively exit said first and second wire supplies.

* * * * *